Figure 1:
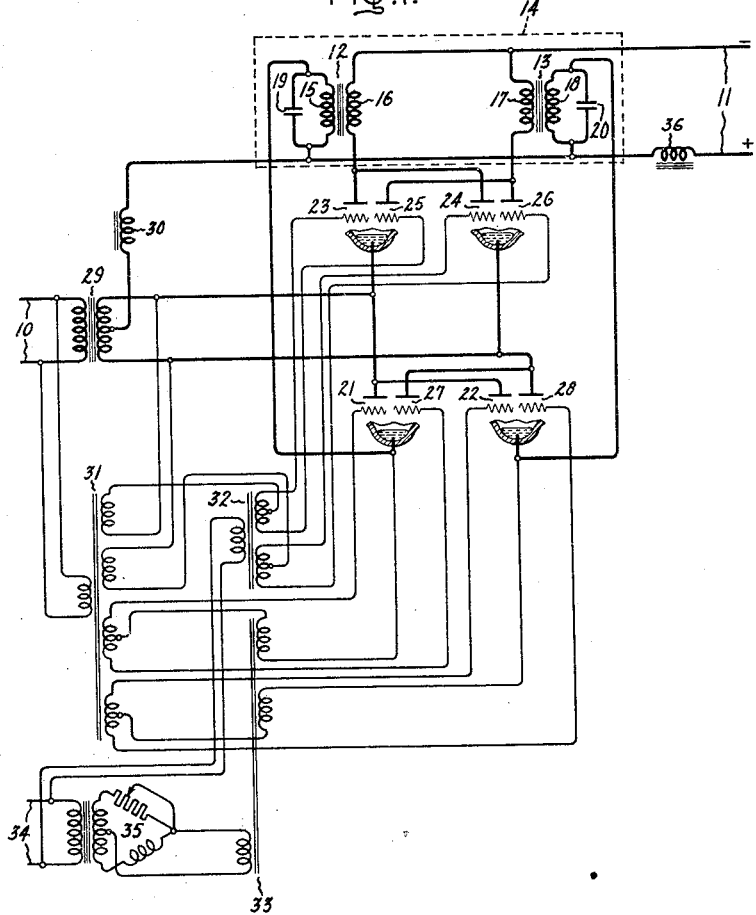

April 12, 1938.  C. A. SABBAH  2,114,192

ELECTRIC VALVE CONVERTING SYSTEM

Filed Jan. 23, 1937  2 Sheets-Sheet 1

Inventor:
Camil A. Sabbah, Deceased,
by William A. Dodge, Administrator.

by  Harry E. Dunham
Attorney.

April 12, 1938. C. A. SABBAH 2,114,192
ELECTRIC VALVE CONVERTING SYSTEM
Filed Jan. 23, 1937 2 Sheets-Sheet 2

Inventor:
Camil A. Sabbah, Deceased.
by William A. Dodge, Administrator.
by Harry E. Dunham
Attorney.

Patented Apr. 12, 1938

2,114,192

UNITED STATES PATENT OFFICE 2,114,192

ELECTRIC VALVE CONVERTING SYSTEM

Camil A. Sabbah, deceased, late of Schenectady, N. Y., by William A. Dodge, administrator, Schenectady, N. Y., assignor to General Electric Company, a corporation of New York Application January 23, 1937, Serial No. 122,042

8 Claims. (Cl. 175—363)

This invention relates to electric valve converting systems, and more particularly to such systems suitable for transferring energy between direct and alternating current circuits.

An electric valve converting system suitable for transferring energy between constant potential and constant current circuits is disclosed in United States Letters Patent No. 1,961,080, granted May 29, 1934, upon the application of C. A. Sabbah. The apparatus disclosed therein utilizes a three-legged reactor having inductive windings on the several legs thereof and an energy storage device or capacitor associated with at least a portion of the inductive windings on each leg. In the copending patent applications of C. A. Sabbah, deceased, Serial No. 89,593, filed July 8, 1936, and Serial No. 89,592, filed July 8, 1936, both for Electric valve converting systems, there are disclosed therein apparatus utilizing a two-legged reactor having inductive windings on the several legs thereof and a plurality of energy storage devices or capacitors associated with these inductive windings. In the arrangement disclosed in the application Serial No. 89,593, the system is particularly suited for transferring energy between constant potential and constant current direct current circuits whereas the arrangement disclosed in the application Serial No. 89,592 is particularly suited for the transfer of energy between direct and alternating current circuits, one of which has a constant current characteristic. In certain instances, however, it may be desirable to provide an electric valve converting system having a constant potential characteristic when the load resistance is below a certain value and a constant current characteristic when the load resistance exceeds a certain value.

Accordingly, one of the objects of this invention is to provide an improved electric valve converting system which will have a constant potential characteristic under certain conditions and a constant current load characteristic under other conditions.

A further one of the objects of this invention is to provide an improved electric valve converting system of this type wherein the size of the apparatus comprising the system may be reduced to a minimum and which will be simple and reliable in operation.

It is a further object of this invention to provide an improved electric valve converting system for transferring energy between direct and alternating current circuits wherein the electric valve means are rendered conductive at a frequency which is higher than the frequency of the alternating current circuit.

The novel features which are believed to be characteristic of this invention are set forth with particularity in the appended claims. The invention itself, however, both as to its organization and tentative operation, together with further objects and advantages thereof will be better understood by reference to the following description taken in connection with the accompanying drawings in which Fig. 1 represents one embodiment of the invention utilizing a two-legged magnetic core structure provided with windings and capacitors which operate as an energy storage and transfer device, and Fig. 2 is a modification of the invention utilizing a three-legged energy storage and transfer device.

Figure 2:
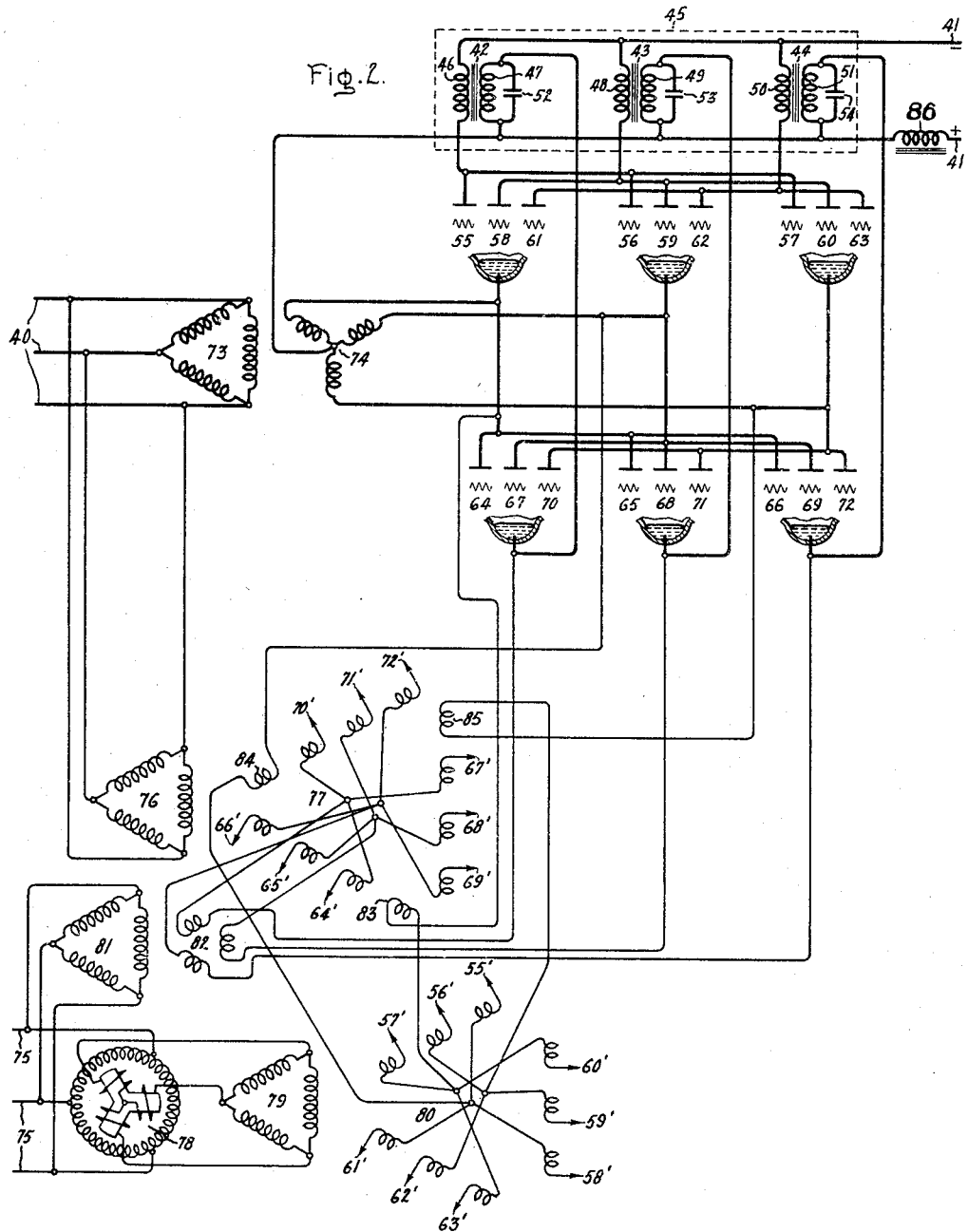

Referring now more particularly to Fig. 1 of the drawings, there is illustrated an electric valve converting system for transferring energy between an alternating current circuit 10 and a direct current circuit 11. This system is provided with an energy storage and transfer device comprising a two-legged magnetic core structure of the type utilized in the copending applications of C. A. Sabbah, Serial No. 89,593, and Serial No. 89,592. In the drawings, the two legs 12 and 13 of this magnetic core structure are shown to be a part of the same magnetic core structure by means of the dotted line 14. Each of the legs of the magnetic core structure is provided with a pair of windings 15, 16 and 17, 18, respectively. One winding of each pair of inductive windings is provided with an energy storage device which may be in the form of capacitors 19 and 20 which may be connected in parallel with windings 15 and 18, respectively. One terminal of each of the windings 15 and 18 is connected to one side of the direct current circuit 11 whereas one terminal of each of the windings 16 and 17 is connected to the other side of the direct current circuit 11. Each of the remaining extremities of the inductive windings 15, 16, 17, and 18 is provided with a plurality of electric discharge paths 21, 22, 23, 24, 25, 26, and 27, 28, respectively. These several discharge paths interconnect the terminals of these windings with one of the windings of transformer 29, the midpoint of which is connected through the direct current reactor 30 to one side of the direct current circuit 11. The other winding of the transformer 29 is connected to the alternating current circuit 10. While each of the electric discharge paths 21 to 28 is shown as being provided with an anode, a cathode, and a control grid, and represented as four single cathode, double-anode discharge devices, these valves may be any of the several types well-known in the art, although it is preferable to utilize valves of the type containing an ionizable medium and which are provided with control or starting electrodes whereby the discharge paths between the anodes and cathodes may be controlled.

The control electrodes or grids of the valves 21 to 28 are energized from suitable sources of alternating current by means of the transformers 31, 32, and 33. The transformer 31 is energized from a source of current, the frequency of which is equal to the frequency of the alternating current circuit 10 or it may be energized directly from this circuit as illustrated. The transformer 32 is energized directly from a suitable source of alternating current 34 while the transformer 33 is also energized from this same source of current through the phase shifting apparatus 35. The frequency of the alternating current source 34 is preferably higher than the frequency of the alternating current circuit 10 and it may be a multiple thereof. Each of the control circuits for the electric discharge paths 23 and 25 includes a portion of one of the secondary windings of transformer 32 and one of the secondary windings of transformer 31. Likewise, each of the control circuits for the electric discharge paths 24 and 26 includes a portion of one of the other secondary windings of the transformer 32 and one of the secondary windings of transformer 31. The control circuits for the electric discharge paths 21 and 27 each includes a portion of one of the secondary windings of transformer 31 and one of the secondary windings of transformer 33, and similarly the control circuits of the electric discharge paths 22 and 28 each includes a portion of one of the secondary windings of transformer 31 and one of the secondary windings of transformer 33. In accordance with the customary practice, the value of the grid current in each of the control circuits may be limited by inserting therein suitable resistors. It will be apparent that each of the control electrodes is controlled by the combination of two alternating current components, one of which is equal in frequency to the alternating current circuit 10 and the other of which is of a frequency higher than the frequency of the alternating current circuit 10. In order to prevent any interaction between the direct current circuit 11 and the electric valve converting apparatus, the direct current reactor 36 may be connected in one of the direct current circuit leads.

For the purpose of obtaining the desired output characteristics, the multiple frequency phase relations between the arc discharge paths 22, 28, 21, 27 and the arc discharge paths 24, 26, 23, and 25 are such that the proper operation of the energy storage device is obtained. Thus from a certain predetermined point in the output characteristic the system operates to produce a constant potential characteristic when the load resistance is decreased and a constant current characteristic when the load resistance is increased from a certain predetermined value. It will be apparent to those skilled in the art that since the transformers 31 and 32 are energized from the alternating current circuit 10, the power factor of the converting apparatus in its entirety will change and hence it is possible by means of the grid circuit provided to obtain this particular output characteristic. Thus when the converting apparatus is supplying power to a load which is decreasing in load resistance the output characteristic is a constant potential characteristic and the operation is as follows. The relation of the fundamental frequency component obtained from the circuit 10 to control the various discharge paths by means of the grid control electrodes is such that the discharge path 21 or 22 will be energized when the upper terminal of the secondary winding of the transformer 29 is positive with respect to the neutral thereof. Thus the current will transfer back and forth between the arc discharge paths 21 and 22 at a multiple frequency, thereby causing the energy storage devices comprising the transformers 12 and 13 and the associated capacitors 19 and 20 to operate at a multiple frequency. On the other hand, if the potentials obtained on the secondary side of the transformer are such that the lower terminal is positive with respect to the neutral point the fundamental frequency component of the grid excitation is such that the arc discharge paths 27 and 28 are energized at the fundamental frequency and energy is transferred at a multiple frequency between the arc discharge paths 27 and 28, thereby causing the energy storage devices to operate at this multiple frequency.

At the time that the load resistance is increasing in value the converting apparatus operates to provide a constant current output and the operation is as follows. Assuming that the upper terminal of the secondary winding of the transformer 29 is positive with respect to the neutral thereof, the fundamental frequency component of grid excitation of the arc discharge paths 23 and 25 is such as to excite the control electrodes thereof and these arc discharge paths operate at a multiple frequency to transfer energy therebetween. Obviously, of course, this causes the energy storage transfer device to operate at the multiple frequency. When the lower terminal of the secondary winding of the transformer 29 is positive with respect to the neutral thereof, the fundamental frequency component of grid excitation is such as to cause the arc discharge paths 24 and 26 to become conductive at the multiple frequency of the circuit 34. Thus, in one instance the converting apparatus operates to provide a constant potential output when the load resistance is decreasing and a constant current output when the load resistance is increasing.

The arrangement disclosed in Fig. 2 is provided with an energy storage and transfer device comprising a three-legged magnetic core structure arranged to transfer energy between an alternating current circuit 40 and a direct current circuit 41. In the drawings, the three legs 42, 43, and 44 of the magnetic core structure are shown to be part of the same magnetic core structure by means of the dotted line 45. Each of the legs of the magnetic core structure is provided with a pair of windings 46, 47; 48, 49; 50, 51; respectively. One winding of each pair of the inductive windings is provided with an energy storage device which may be in the form of capacitors 52, 53, and 54 which may be associated as shown with the windings 47, 49, and 51, respectively. One terminal of each of the windings 46, 48, and 50 is connected to one side of the direct current circuit 41, whereas the opposite terminal of each of the windings 47, 49, and 51 is connected to the other side of the direct current circuit 41. Each of the remaining extremities of the windings 46 to 51, inclusive, is provided with a plurality of electric discharge paths 55 to 72, inclusive. Thus, for example, the one extremity of the transformer or inductive winding 46 is connected to the arc discharge paths 55, 56, and 57, whereas the other extremity of the inductive winding 47 is connected to the arc discharge paths 64, 67, and 70. Likewise, each of the other terminals of the windings 48, 49, 50 and 51 is provided with three of the arc discharge paths shown in the drawings. The alternating current circuit 40 is connected to the primary winding of a three phase transformer 73, the secondary winding 74 of which is preferably arranged in star relation so that its neutral point may be connected to one side of the direct current circuit 41 and the extremities of the secondary winding are connected to the conductors leading between the cathodes of the upper group of electric discharge paths 55 to 63 to the anodes of the lower group of electric discharge paths 64—72. While each of the discharge paths 55 to 72 is shown as being provided with an anode, a cathode, and a control grid and being represented as a plurality of single-cathode, three-anode discharge devices, these arc discharge paths may be valves of any of the several types well-known in the art, although it is preferable to utilize valves of the type containing an ionizable medium and which are provided with either control or starting electrodes whereby the discharge paths between the anodes and cathodes may be controlled.

Each of the control electrodes or grids of the arc discharge paths 55—72 is energized from a suitable source of alternating current by means of a plurality of transformers arranged so as to provide alternating current components from the alternating current circuit 40 and from the three-phase alternating current circuit 75. This latter alternating current circuit 75 has a frequency which is preferably higher than the frequency of the alternating current circuit 40 and which may be a multiple thereof. The alternating current circuit 40 is connected to the primary winding 76 of a transformer, the secondary windings 77 of which are connected in star relation so as to provide three separate neutral points. For the purpose of clarity in disclosure, the connections to the extremities of certain of these windings which would normally lead to the grids of the discharge paths 64—72 are not shown but merely indicated by an arrow and a primed number corresponding to the arc discharge path, to the grid of which the particular transformer winding is connected. A three phase alternating current circuit 75 is connected through a suitable phase shifting device 78 to the primary winding 79 of a transformer having a secondary 80 which likewise comprises a plurality of windings arranged in a plurality of star connections, thereby providing a plurality of neutral points. Since the secondary windings 77, which are arranged in a plurality of star-connected groups, are energized from the fundamental frequency source 70, provision must be made to introduce into the grid circuits of the various arc discharge paths 64—72 a component of the multiple frequency alternating current circuit 75. This is accomplished by connecting the circuit 75 to the primary winding 81 of a three-phase transformer which is provided with a secondary winding 82. The windings 82 of this transformer are connected in series between the neutral points of the various star-connected secondary windings 77 and the cathodes of the arc discharge paths such as 64, 65, and 66, respectively. Since the secondary windings 80 which are arranged in a plurality of star-connected arrangements thereby providing neutral points, are energized from the high frequency circuit 75, means must be provided for introducing a component of the fundamental frequency of the alternating current circuit 40 and this is accomplished by connecting windings 83, 84, and 85 of the transformer 76, 77 between the various neutral points of the transformer 80 and the cathodes of the arc discharge paths 55, 56, and 57, respectively. From this it will be apparent that each of the control electrodes of the various arc discharge paths 55 to 72 is controlled by a combination of two alternating components, one of which is equal to the frequency of the alternating circuit 40 and the other of which is of a frequency higher than the frequency of this alternating current circuit and is derived from the alternating current circuit 75. In order to prevent any interaction between the direct current circuit 41 and this converting apparatus, a direct current reactor 86 may be connected in one of the direct current leads. Since the operation of this three phase circuit is similar to the operation of the circuit disclosed in Fig. 1, it is believed that the operation of this circuit will be apparent to those skilled in the art and hence no detailed explanation thereof need be given.

While this invention has been shown and described in connection with certain specific embodiments it will, of course, be understood that it is not to be limited thereto, since it is apparent that the principles herein disclosed are susceptible of numerous other applications, and modifications may be made in the circuit arrangement and in the instrumentalities employed without departing from the spirit and scope of the invention as set forth in the appended claims.

What is claimed as new and desired to be secured by Letters Patent of the United States is:

1. An electric valve converting system for transferring energy between two circuits, comprising an $n$-legged core structure having a pair of inductive windings on each leg thereof, an energy storage device associated with one winding on each leg, electric valve means providing a plurality of electric discharge paths for each of said windings and interconnecting said windings with said circuits, and means for rendering conductive said electric discharge paths at a frequency which is greater than the frequency of the alternating current component present in said system.

2. An electric valve converting system for transferring energy between direct and alternating current circuits, comprising a multilegged core structure provided with a pair of windings on each leg thereof, an energy storage device for one winding of each pair of windings, a transformer having one of its windings connected to said alternating current circuit, means including electric discharge valve means connecting the windings of said pairs of windings from one side of said direct current circuit through the other transformer winding to the other side of said direct current circuit, and means for controlling the conductivities of said valve means.

3. An electric valve converting system for transferring energy between direct and alternating current circuits comprising a multilegged core structure provided with a pair of windings on each leg thereof, one terminal of each of said windings being connected to said direct current circuit, a plurality of energy storage devices each associated with a different pair of said windings, a transformer having one winding connected to said alternating current circuit, said transformer being provided with a winding having a neutral point which is connected to one side of said direct current circuit, electric discharge valve means connecting said latter transformer winding with the remaining terminals of said windings on said core structure, and means for controlling the conductivities of said electric valve means.

4. An electric valve converting system for transferring energy between alternating and direct current circuits comprising a two-legged magnetic core structure having a pair of inductive windings on each leg thereof, an energy storage device associated with one winding on each leg, means including electric valve means interconnecting said windings with said circuits, and means for rendering conductive said electric valve means at a frequency which is higher than the frequency of said alternating current circuit.

5. An electric valve converting system for transferring energy between direct and alternating current circuits, comprising a two-legged magnetic core structure having a pair of windings on each leg thereof, an energy storage device associated with one winding on each leg to maintain a substantially constant magnetomotive force in said structure, means including electric valve means for interconnecting said windings of said structure with said circuits, and means for controlling the conductivity of said valve means, said means being responsive to the power factor of said system to cause said system to tend to have a constant current output characteristic under full load and to have a constant potential output characteristic under light load.

6. An electric valve converting system for transferring energy between direct and alternating current circuits, comprising an $n$-legged magnetic core structure having a pair of windings on each leg thereof, an energy storage device for one winding on each leg thereof to maintain a substantially constant magnetomotive force in said structure, a transformer connected to said alternating current circuit, electric valve means providing a plurality of electric discharge paths for each of the windings of said magnetic core structure, means including a portion of said valve means for interconnecting said transformer with said direct current circuit to tend to supply thereto a constant potential component, means including all of said valve means interconnecting said transformer, said windings of said magnetic core structure and said direct current circuit to tend to supply to said direct current circuit a constant current component, and a control circuit for said valves responsive to the load conditions of said direct current circuit for determining which of said tendencies shall predominate.

7. An electric valve converting system for transferring energy between alternating and direct current circuits comprising a polyphase core structure having two groups of inductive windings, a plurality of energy storage devices associated with one group of said windings, an alternating current network associated with said alternating current circuit, means including a plurality of electric discharge paths for each of the windings of said polyphase core structure and interconnecting said windings and said alternating current network with said direct current circuit, means for controlling the conductivity of each of said electric discharge paths, a control circuit for each of said means, and means for energizing said control circuits with alternating currents one of which is of a frequency equal to said first-mentioned alternating current circuit and the other of which is a multiple frequency of said first alternating current circuit.

8. A system for transmitting energy between a direct current circuit and an alternating current circuit comprising a polyphase core structure having two groups of inductive windings thereon, a capacitor for each winding of one of said groups for maintaining a substantially constant magnetomotive force in said structure, an alternating current network associated with one of said circuits, and means including electric discharge apparatus interconnecting the windings of said polyphase core structure and said alternating current network with one of said circuits, said electric discharge apparatus providing a plurality of electric discharge paths for each of the windings of said polyphase core structure, means for controlling the conductivity of said electric discharge paths, a plurality of control circuits for said means, means for energizing said control circuits with a plurality of alternating currents, one of which has a frequency equal to the frequency of the alternating current component present in said alternating current network and the other of which has a frequency which is a multiple thereof, and means for controlling the phase relation between said alternating currents of different frequencies.

WILLIAM A. DODGE,
*Administrator of the Estate of Camil A. Sabbah, Deceased.*